United States Patent
Takehara et al.

(10) Patent No.: US 7,398,670 B2
(45) Date of Patent: Jul. 15, 2008

(54) PRESSURE SENSOR FOR DETECTING COLLISION

(75) Inventors: Satoru Takehara, Obu (JP); Taiki Katsu, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/417,295

(22) Filed: May 2, 2006

(65) Prior Publication Data

US 2006/0266101 A1    Nov. 30, 2006

(30) Foreign Application Priority Data

May 12, 2005    (JP) ............................. 2005-139951

(51) Int. Cl.
*G01M 7/00*    (2006.01)
*G01N 3/00*    (2006.01)
*G01N 33/00*   (2006.01)
*G01P 15/00*   (2006.01)

(52) U.S. Cl. .................................................. 73/12.09

(58) Field of Classification Search ................ 73/12.09, 73/129
See application file for complete search history.

(56) References Cited

U.S. PATENT DOCUMENTS

| | | | | |
|---|---|---|---|---|
| 5,206,469 A | * | 4/1993 | Takeda et al. ......... | 200/61.45 M |
| 5,277,441 A | * | 1/1994 | Sinnhuber ............... | 280/730.1 |
| 5,281,780 A | * | 1/1994 | Haland ...................... | 200/52 R |
| 5,392,024 A | * | 2/1995 | Kiuchi et al. .............. | 340/436 |
| 5,454,590 A | * | 10/1995 | Haland ..................... | 280/734 |
| 5,623,246 A | * | 4/1997 | Kruse et al. ................ | 340/438 |
| 5,748,075 A | | 5/1998 | Dirmeyer et al. | |
| 5,756,948 A | * | 5/1998 | Husby et al. ............. | 200/61.53 |
| 6,204,756 B1 | * | 3/2001 | Senyk et al. ................ | 340/438 |
| 6,278,811 B1 | * | 8/2001 | Hay et al. .................... | 385/13 |
| 7,025,163 B2 | * | 4/2006 | Fuertsch et al. ............. | 180/274 |
| 2002/0084637 A1 | * | 7/2002 | Mattes ........................ | 280/735 |

FOREIGN PATENT DOCUMENTS

DE    101 06 311    8/2002
WO    WO2004/078530    9/2004

OTHER PUBLICATIONS

Office Action dated Sep. 28, 2007 from corresponding Chinese patent application No. 2006 1007 9954.1.
German Office Action dated Feb. 12, 2007 in German Application No. 10 2006 020 559.6-21 with English translation.

* cited by examiner

*Primary Examiner*—Edward Lefkowitz
*Assistant Examiner*—Octavia Davis
(74) *Attorney, Agent, or Firm*—Harness, Dickey & Pierce, PLC

(57) ABSTRACT

A pressure sensor, which is mounted on a vehicle for detecting a collision, has a detecting part for detecting a change of pressure and a housing for housing the detecting part therein. The housing is located in a hollow body defined in a part of the vehicle. The housing forms a passage hole for allowing communication between an inside of the housing and the hollow body. The passage hole has a first end opening adjacent to the detecting part and a second end opposite to the first end. The second end is located lower than the first end. The passage hole defines a passage area that increases from the first end toward the second end.

20 Claims, 5 Drawing Sheets

PRESSURE SENSOR FOR DETECTING COLLISION

CROSS REFERENCE TO RELATED APPLICATION

This application is based on Japanese Patent Application No. 2005-139951 filed on May 12, 2005, the disclosure of which is incorporated herein by reference.

FIELD OF THE INVENTION

The present invention relates to a pressure sensor mounted in a hollow body of a vehicle side portion to detect a change of pressure in the hollow body for detecting an occurrence of a side collision, particularly, relates to the pressure sensor having a housing that accommodates a detecting part therein and forms a passage for introducing an air pressure toward the detecting part.

BACKGROUND OF THE INVENTION

To detect an occurrence of a side impact traffic collision, it is proposed to install a pressure sensor in a hollow body defined in the inside of a vehicle door and measure a change of an air pressure. This kind of pressure sensor is for example disclosed in Japanese Patent No. 2654428 (U.S. Pat. No. 5,748,075).

In such a pressure sensor, a detecting part for detecting the air pressure is arranged in a resinous housing. The housing is formed with a passage through which air in the hollow body is introduced toward the detecting part. Incidentally, water or oil is likely to adhere to an inner wall of the passage due to condensation. If such a water or oil forms a film in the passage due to a surface tension and blocks the passage, detecting sensitivity of the sensor is likely to deteriorate.

SUMMARY OF THE INVENTION

The present invention is made in view of the foregoing matter, and it is an object of the present invention to provide a pressure sensor for detecting a collision, which is capable of effectively discharging a fluid such as water adhering to a passage hole of a housing.

According to an aspect of the present invention, the pressure sensor has a detecting part for detecting a change of pressure and a housing for housing the detecting part therein. The housing is located in a hollow body defined in a part of a vehicle. The housing forms a passage hole for allowing communication between an inside of the housing and the hollow body. The passage hole has a first end opening adjacent to the detecting part and a second end opposite to the first end. Further, the second end is located at a position lower than the first end. The passage hole defines a passage area that increases with a distance from the first end.

When a bulk of the hollow body reduces and a pressure in the hollow body increases upon an occurrence of a side collision, air in the hollow body is introduced in the housing through the passage hole. Accordingly, the change of air pressure is detected by the detecting part. Further, the occurrence of the side collision is detected based on the detected air pressure change.

In this kind of pressure sensor, in a case that a fluid such as water and oil adheres to an inner wall of the passage hole due to condensation, it may form a film blocking the passage hole. Since the passage area increases with the distance from the first end, a thickness of the film decreases as an area of the film increases while moving downwardly by its weight. As the film breaks by losing a balance between an intermolecular force and a surface tension, the fluid is easily discharged from the passage hole. Accordingly, it is less likely that the film will remain in the passage hole and deteriorate detecting sensitivity for a long time.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

Figure 1:
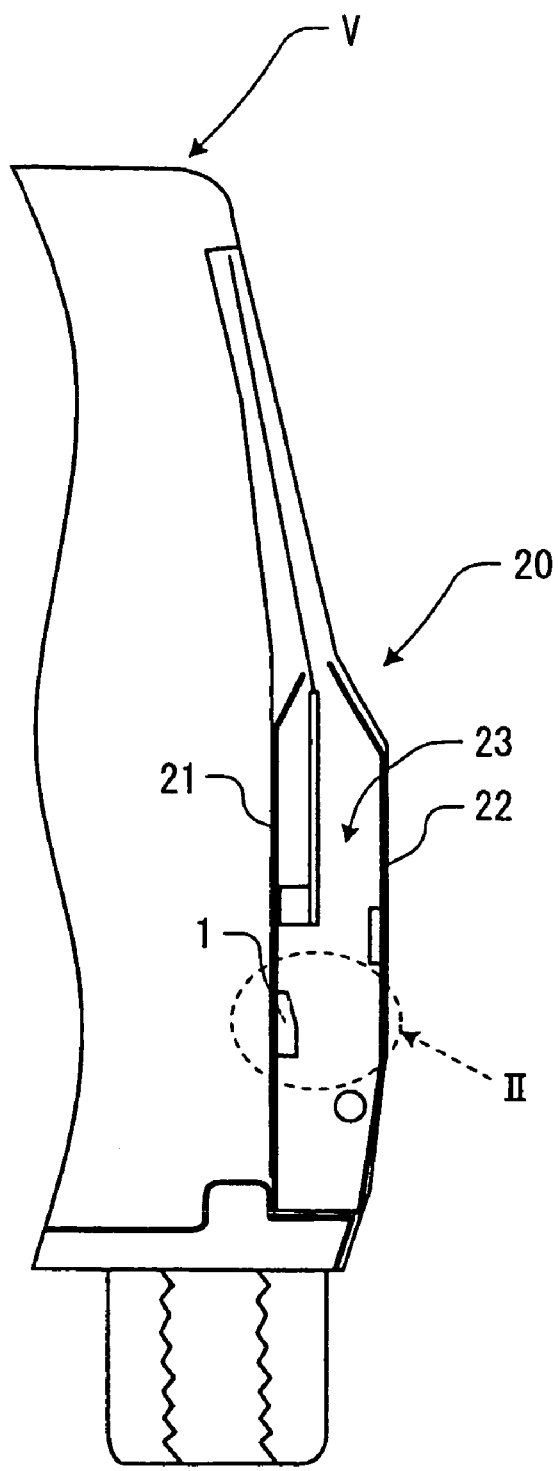
FIG. 1 is a schematic sectional view of a vehicle door accommodating a pressure sensor therein according to an example embodiment of the present invention.

An example embodiment of the present invention will now be described with reference to FIGS. 1 to 5. As shown in FIG. 1, a pressure sensor 1 of the example embodiment is for example located in a hollow body 23 defined in a side door 20 of a vehicle V. The door 20 has an inner panel 21 located on an inner side of the vehicle and an outer panel 22 defining an outer side of the vehicle. The inner panel 21 and the outer panel 22 defines the hollow space (hollow body) 23 between them. The pressure sensor 1 is fixed to the inner panel 21, inside of the hollow body 23.

Figure 2:
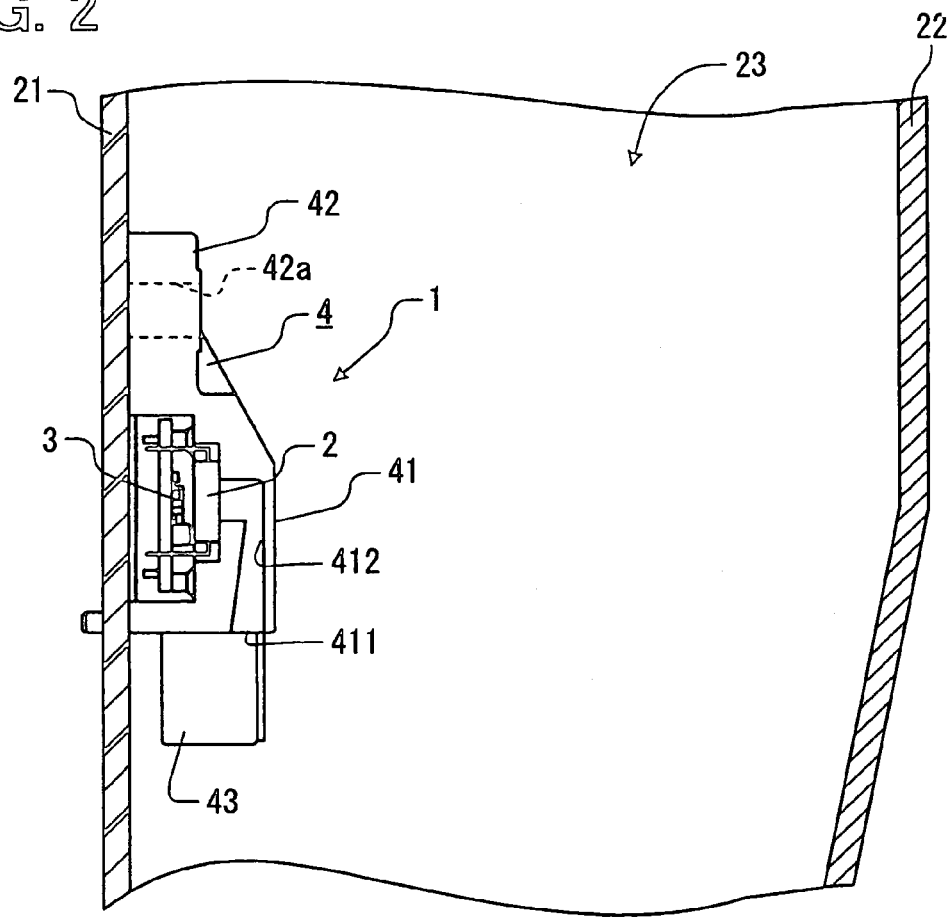
FIG. 2 is an enlarged sectional view of a part of the door denoted by an arrow II in FIG. 1.

As shown in FIG. 2, the pressure sensor 1 has a detecting part 2, a circuit part 3, and a housing 4 for housing the detecting part 2 and the circuit part 3 therein. The detecting part 2 is composed of a sensing device that detects a change of air pressure. The sensing device is for example a semiconductor type pressure sensor.

The circuit part 3 includes an electric circuit that produces an electric signal relating to the change of air pressure detected in the detecting part 2. The electric circuit is connected to a collision detecting ECU (not shown) through a code that is connected to a connector portion 43. The electric signal is sent to the collision detecting ECU.

Figure 3:
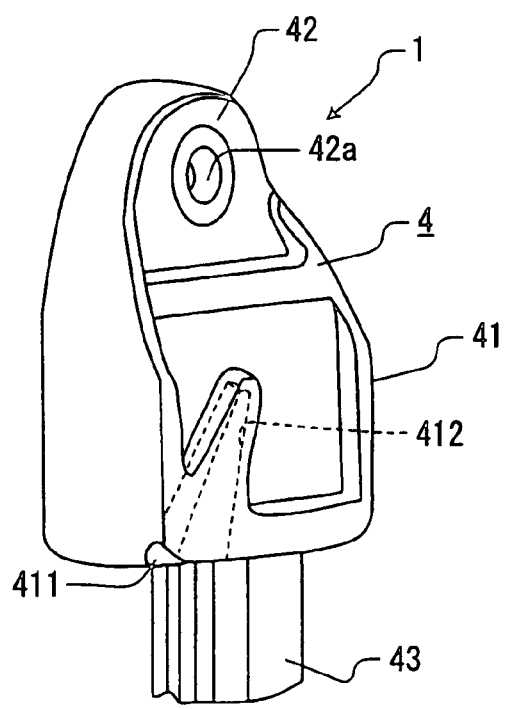
FIG. 3 is a perspective view of the pressure sensor according to the example embodiment of the present invention.

The housing 4 is for example molded with resin. As shown in FIGS. 2 and 3, the housing 4 has a substantial box shape when viewed from a front side. The housing 4 has a body portion 41, a fixing portion 42 formed on the body portion 41 and the connector portion 43 formed under the body portion 41. The body portion 41 houses the detecting part 2 and the circuit part 3 therein. The fixing portion 42 is formed with a fixing hole 42a for passing through a bolt to be fixed to the inner panel 21. The connector portion 43 receives the code of the collision detecting ECU. The detecting part 2 and the circuit part 3 receive electric power through the connector portion 43.

The body portion 41 is formed with a passage hole 412 and an opening 411. The opening 411 is located at a lower corner portion of the body portion 41 and opens downward. The passage hole 412 allows communication between an inside of the body portion 41 and the hollow body 23. Namely, air in the hollow body 23 is introduced to the detecting part 2 through the passage hole 412 with the change of air pressure.

Figure 4:
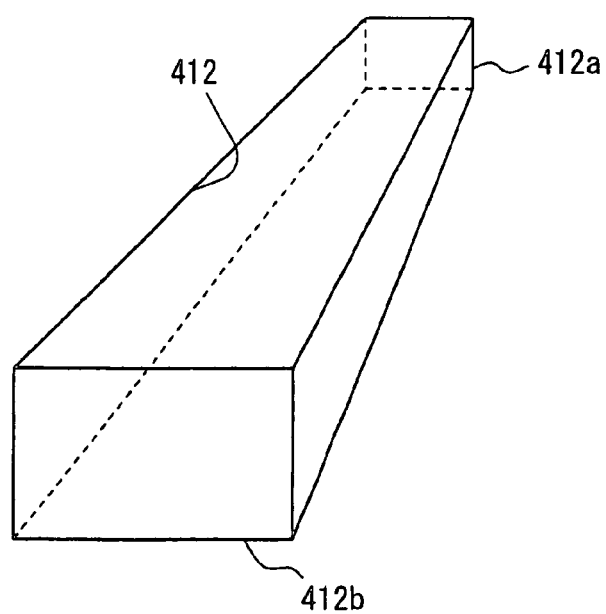
FIG. 4 is a schematic perspective view of a passage hole formed in a housing of the pressure sensor according to the example embodiment of the present invention.

As shown in FIG. 4, a first end 412a of the passage hole 412, which is located adjacent to the detecting part 2 inside of the body portion 41, has a passage area (sectional area) smaller than that of a second end 412b defining the opening 411. The passage area of the passage hole 412 gradually increases from the first end 412a toward the second end 412b.

For example, the passage hole 412 has a rectangular-shaped cross-section. The first end 412a has a passage area of 3 mm×2 mm. The second end 412b has a passage area of 8 mm×5 mm. Also, the a length of the passage hole 412 from the first end 412a to the second end 412b is 20 mm. Namely, the passage area continuously increases with a distance from the first end 412a, with respect to two directions, i.e., a longitudinal side and a shorter side of the rectangular shape. The dimensions of the passage hole 412 are not limited to the above, but are set to different values according to a whole size of the pressure sensor 1.

Figure 5:
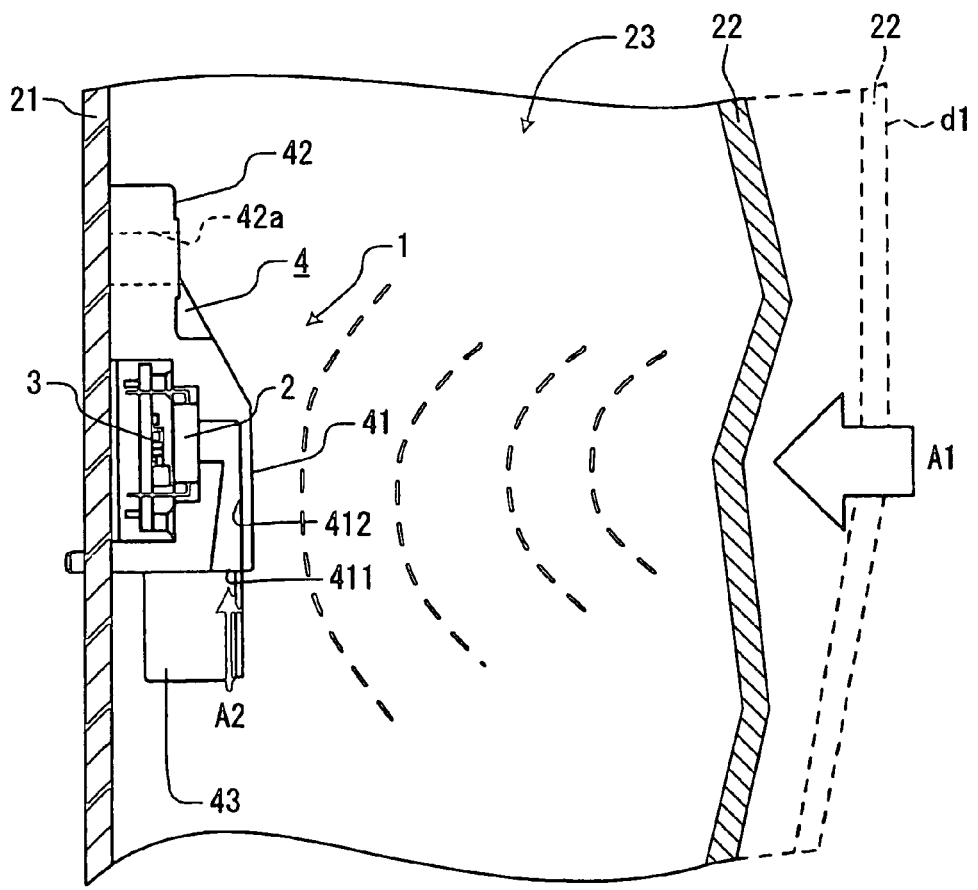
FIG. 5 is an explanatory sectional view of the door for showing a condition when a collision occurs at the door.

Next, operation of the pressure sensor 1 when a side collision occurs at the door 20 will be described with reference to FIG. 5.

When the side collision occurs at the door 20 (arrow A1, in FIG. 5), a bulk inside of the hollow body 23 reduces and the air pressure in the hollow body 23 increases. In FIG. 5, a dotted line d1 denotes an original shape of the door 20 before the collision. At this time, the air in the hollow body 23 is introduced to the detecting part 2 through the opening 411 and the passage hole 412, as shown by an arrow A2 in FIG. 5.

Thus, the detecting part 2 detects the change of air pressure. The circuit part 3 produces the electric signal according to the change of air pressure detected by the detecting part 2. The collision detecting ECU receives the electric signal through the code connected to the connector portion 43. Accordingly, the collision detecting ECU detects an occurrence of the side collision based on the electric signal sent from the pressure sensor 1.

Next, effect of the passage hole 412 of the example embodiment will be described with reference to FIG. 6, and FIGS. 9 and 10 as a comparison example.

In the pressure sensor 1, for example, a fluid such as water and oil may adhere to the inner wall of the passage hole 412 due to condensation. If the fluid forms a film F1 and the passage hole 412 is blocked by the film F1, detecting sensitivity of the detecting part 2 is likely to deteriorate.

Figure 6:
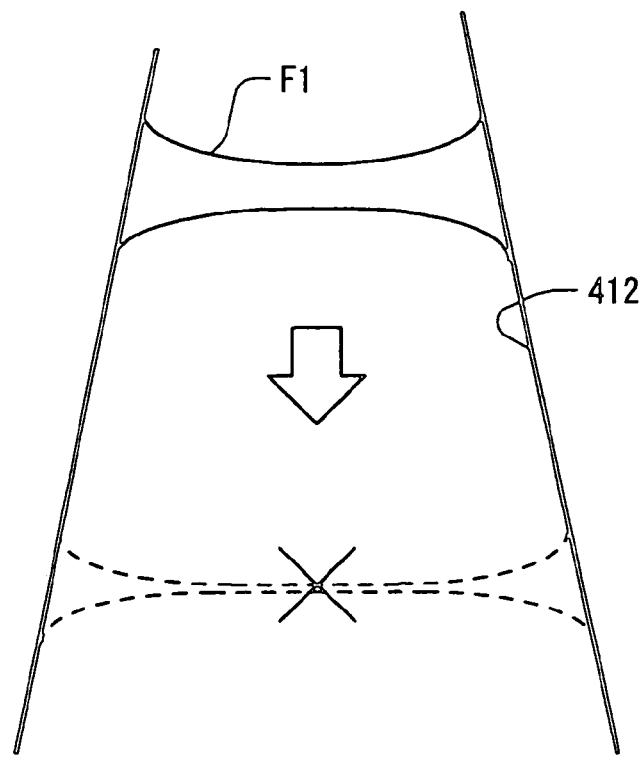
FIG. 6 is an explanatory view of the passage hole for showing a condition when a film blocking the passage hole moves downward.
Figure 9:
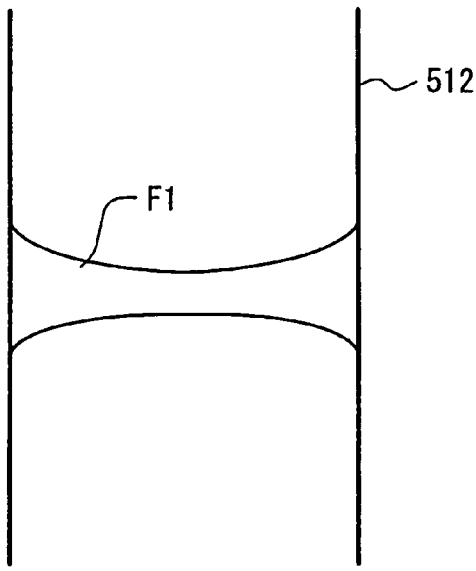
FIG. 9 is an explanatory view of a passage hole as a comparison example to the example embodiment shown in FIG. 6.
Figure 10:
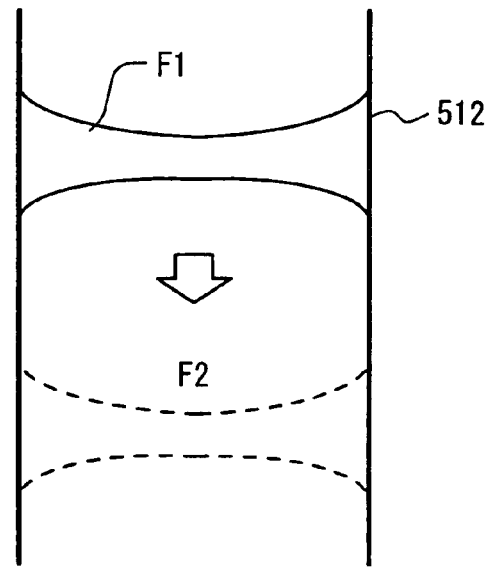
FIG. 10 is an explanatory view of the passage hole as the comparison example to the example embodiment shown in FIG. 6.

FIGS. 9 and 10 show a passage hole 512 having a passage area that is constant in a longitudinal direction of the passage hole 512, as a comparison example to the example embodiment shown in FIG. 6. In the passage hole 512 of FIGS. 9 and 10, a surface tension of the film F1 does not change, even if the film F1 moves downward to the opening 411 by the gravity (F2 in FIG. 10). Therefore, the film F2 will not easily break and will remain in the passage hole.

On the contrary, in the example embodiment shown in FIG. 6, the passage area of the passage hole 412 gradually increases from the upper end 412a to the lower end 412b. As the film F1 moves to the lower end 412b by its gravity force, the area of the film F1 increases and the thickness of the film F1 reduces. As a result, the film F1 easily breaks by losing a balance between intermolecular forces and a surface tension. Therefore, the fluid such as water and oil is smoothly discharged from the opening 411, as compared to the case shown in FIGS. 9 and 10. Accordingly, since the fluid adhered to the inner wall of the passage hole 412 is effectively discharged from the opening 411, it is less likely that a condition that detecting sensitivity of the detecting part 2 is deteriorated due to the film F2 will not continue for a long time.

Further, since the passage hole 412 has a rectangular-shaped cross-section both sides of which increase with the distance from the first end 412a, the liquid adhering to the inner wall of the passage hole 412 is effectively discharged from the opening 411. The passage hole 412 having this feature has a rate of increase of the passage area in the longitudinal direction of the passage hole 412 larger than that of a passage hole that has a rectangular-shaped cross-section only one side of which increases and the remaining side of which is constant. When the rate of increase of the passage area is not enough, a change of the surface tension of the film is small even if the film moves toward the opening 411.

In the passage hole 412 of the example embodiment, the rate of increase of the passage area is large and the change of the surface tension of the film F1 is large. Therefore, the film F1 is likely to easily break by losing the balance between the intermolecular forces and the surface tension. Accordingly, the liquid easily flows out from the opening 411.

One example embodiment of the present invention is described above. However, the present invention is not limited to the above example embodiment, but may be implemented in other ways without departing from the spirit of the invention.

The cross-sectional shape of the passage hole 412 may has any other shape, in place of the rectangular shape. For example, the passage hole 412 has an elliptical cross-section that has a major axis and a minor axis continuously increasing with the distance from the first end 412a, as shown in FIG. 7.

Figure 7:
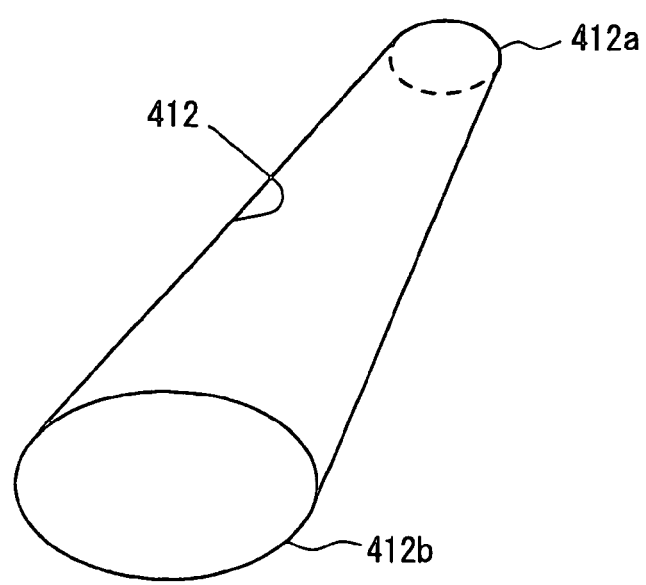
FIG. 7 is a schematic perspective view of the passage hole as a modification of the example embodiment shown in FIG. 6.
Figure 8:
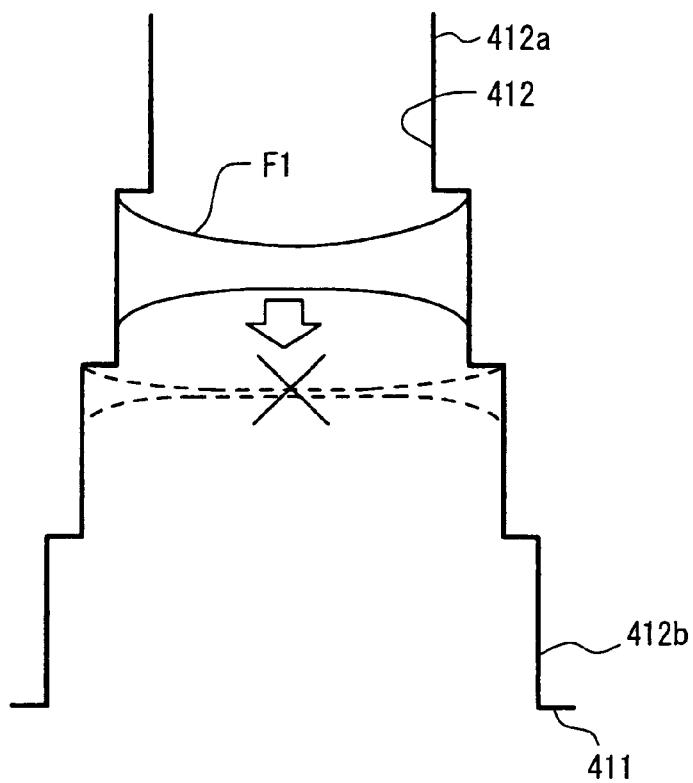
FIG. 8 is an explanatory view of the passage hole as another modification of the example embodiment shown in FIG. 6.

In the example embodiments shown in FIGS. 6 and 7, the passage area of the passage hole 412 continuously increases with the distance from the first end 412a. Alternatively, the passage hole 412 can has a passage space that increases stepwise with the distance from the first end 412a, as shown in FIG. 8. Also in the modified embodiment shown in FIG. 8, the passage area increases with the distance from the first end 412a. Therefore, the film F1 is likely to easily break while moving downward, discharging from the opening 411.

In the above example embodiments, the pressure sensor 1 is mounted in the hollow body 23 defined in the side door 20. However, the pressure sensor 4 can be mounted in a hollow body defined in another part of the vehicle.

What is claimed is:

1. A pressure sensor for detecting a collision of a vehicle, comprising:
   a detecting part for detecting a pressure;
   a housing for housing the detecting part therein, the housing located in a hollow body defined in a part of the vehicle, wherein the housing is formed with a passage hole for allowing communication between an inside of the housing and an inside of the hollow body, the passage hole has a first end adjacent to the detecting part and a second end opposite to the first end, the second end is located at a position lower than the first end and the second end is open to the inside of the hollow body, and the passage hole defines a passage area that increases from the first end toward a middle portion of the passage hole and increases further from the middle portion to the second end, the middle portion being located between the first and second ends.

2. The pressure sensor according to claim 1, wherein the passage hole has a cross-sectional shape, dimensions of which increase with respect to two directions, with a distance from the first end.

3. The pressure sensor according to claim 1, wherein the passage area of the passage hole continuously increases from the first end toward the second end.

4. The pressure sensor according to claim 1, wherein the passage area of the passage hole increases stepwise from the first end toward the second end.

5. The pressure sensor according to claim 1, wherein the passage hole defines a rectangular cross-section.

6. The pressure sensor according to claim 1, wherein the passage hole defines an elliptical cross-section.

7. The pressure sensor according to claim 1, wherein the hollow body is defined in a side part of the vehicle.

8. A pressure sensor for detecting a collision of a vehicle, comprising:

a detecting part for detecting a pressure; and a housing including a housing body portion disposed in an inside of a hollow body of a part of the vehicle, wherein the detecting part is housed in an inside of the housing body portion, the housing further including a passage hole that allows communication between the inside of the housing body portion and the inside of the hollow body, the passage hole includes a first end that is open to the inside of the housing body portion and a second end that is open to the inside of the hollow body, the second end is located lower than the first end and is open in a downward direction, and a cross-sectional area of the passage hole continuously increases from the first end toward the second end.

9. The pressure sensor according to claim 8, wherein the passage hole has a cross-sectional shape, dimensions of which increase with respect to two directions, with a distance from the first end.

10. The pressure sensor according to claim 8, wherein the passage area of the passage hole continuously increases from the first end toward the second end.

11. The pressure sensor according to claim 8, wherein the passage area of the passage hole increases stepwise from the first end toward the second end.

12. The pressure sensor according to claim 8, wherein the passage hole defines a rectangular cross-section.

13. The pressure sensor according to claim 8, wherein the passage hole defines an elliptical cross-section.

14. The pressure sensor according to claim 8, wherein the hollow body is defined in a side part of the vehicle.

15. A pressure sensor for detecting a collision of a vehicle, the pressure sensor comprising:

a housing located in a hollow body defined by the vehicle;

a pressure detector disposed within a chamber defined by the housing; wherein the housing defines a passage hole extending between the chamber defined by the housing and an inside of the hollow body;

the passage hole has a first end open to the chamber defined by the housing and a second end open to the inside of the hollow body, the second end being below the first end; and the passage hole has a cross-sectional area that continuously increases from the first end to the second end.

16. The pressure sensor according to claim 15, wherein the cross-sectional area of the passage hole increases with respect to two directions of the cross-sectional area.

17. The pressure sensor according to claim 15, wherein the cross-sectional area of the passage hole continuously increases from the first end to the second end.

18. The pressure sensor according to claim 15, wherein the cross-sectional area of the passage hole increases stepwise from the first end to the second end.

19. The pressure sensor according to claim 15, wherein the passage hole defines a rectangular cross-section.

20. The pressure sensor according to claim 15, wherein the passage hole defines an elliptical cross-section.

* * * * *